(12) United States Patent
Uehara et al.

(10) Patent No.: US 8,814,256 B2
(45) Date of Patent: Aug. 26, 2014

(54) MOUNTING STRUCTURE FOR FILM-SHAPED ELECTRIC DEVICE

(71) Applicant: Yachiyo Industry Co., Ltd., Sayama (JP)

(72) Inventors: Tatsuaki Uehara, Tochigi-ken (JP); Shigehito Horiuchi, Sakura (JP); Junya Yoshioka, Sakura (JP); Tsutomu Iwaya, Sakura (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 0 days.

(21) Appl. No.: 13/762,760

(22) Filed: Feb. 8, 2013

(65) Prior Publication Data

US 2013/0214562 A1   Aug. 22, 2013

(30) Foreign Application Priority Data

Feb. 20, 2012 (JP) ................................. 2012-033741
Feb. 29, 2012 (JP) ................................. 2012-042783

(51) Int. Cl.
*B60J 3/00* (2006.01)
*B60J 7/043* (2006.01)
*B60J 7/02* (2006.01)
*B60J 3/04* (2006.01)
*E06B 3/263* (2006.01)

(52) U.S. Cl.
CPC .. *B60J 7/022* (2013.01); *B60J 3/04* (2013.01); *B60J 7/043* (2013.01); *E06B 3/26347* (2013.01); *Y10S 136/291* (2013.01)
USPC ...... 296/211; 296/214; 296/216.09; 136/244; 136/251; 136/291

(58) Field of Classification Search
CPC ....................................................... F24J 2/5245
USPC ........ 296/211, 214, 216.06–216.09; 136/244, 136/251, 291
See application file for complete search history.

(56) References Cited

U.S. PATENT DOCUMENTS

| | | | | |
|---|---|---|---|---|
| 4,625,070 A | * | 11/1986 | Berman et al. | 136/249 |
| 5,261,722 A | * | 11/1993 | Staley et al. | 296/211 |
| 5,520,434 A | * | 5/1996 | Paetz et al. | 296/211 |
| 5,664,827 A | * | 9/1997 | Mori et al. | 296/213 |

(Continued)

FOREIGN PATENT DOCUMENTS

| | | |
|---|---|---|
| JP | 9249027 A | 9/1997 |
| JP | 2009 534557 A | 9/2009 |

*Primary Examiner* — Dennis H Pedder
(74) *Attorney, Agent, or Firm* — Dority & Maninng, P.A.

(57) ABSTRACT

Provided is a mounting structure for mounting a film-shaped electric device to a glass panel, comprising: a resin panel attached to a surface of the film-shaped electric device to form a panel-shaped electric device having first and second edges; and first and second retaining members attached to one surface of the glass panel in correspondence with the first and second edges of the panel-shaped electric device, respectively, each first and second retaining member defining a groove such that the groove opens toward a region of the glass panel to be covered by the panel-shaped electric device, wherein the panel-shaped electric device is retained by the first and second retaining members with the first and second edges of the panel-shaped electric device being received in the corresponding grooves such that the surface of the film-shaped electric device having the resin panel attached thereto faces away from the glass panel.

8 Claims, 9 Drawing Sheets

(56) References Cited

U.S. PATENT DOCUMENTS

| | | | |
|---|---|---|---|
| 5,733,382 A * | 3/1998 | Hanoka | 136/251 |
| 6,318,798 B1 * | 11/2001 | Bergmiller | 296/211 |
| 6,331,031 B1 * | 12/2001 | Patz et al. | 296/211 |
| 6,474,729 B2 * | 11/2002 | Patz et al. | 296/211 |
| 6,550,852 B2 * | 4/2003 | Patz et al. | 296/211 |
| 7,817,327 B2 * | 10/2010 | Derda | 359/275 |
| 8,522,490 B1 * | 9/2013 | Stancel | 52/173.3 |
| 2012/0097207 A1 * | 4/2012 | Shufflebotham et al. | 136/244 |

\* cited by examiner

MOUNTING STRUCTURE FOR
FILM-SHAPED ELECTRIC DEVICE

CROSS-REFERENCE TO RELATED
APPLICATIONS

This application claims the priority of Japanese Patent Application No. 2012-033741, filed in the Japanese Patent Office on Feb. 20, 2012, and Japanese Patent Application No. 2012-042783, filed in the Japanese Patent office on Feb. 29, 2012, the disclosures of which are hereby incorporated by reference herein in their entirety for all purposes.

TECHNICAL FIELD

The present invention relates to a mounting structure for mounting a film-shaped electric device to a glass panel, where the film-shaped electric device may be a film-shaped light control device that is operated electrically to vary the characteristics of incident light or a film-shaped electric power generator, such as a solar power generator, that generates electricity from incident light.

BACKGROUND OF THE INVENTION

Light-transmitting glass panels are used in various applications such as in buildings or in vehicles for allowing light to enter inside or for providing a better view. A glass panel is often used in such a manner that its principal surface extends vertically. However, when used in a ceiling window, in an automotive rear window, or in an automotive sunroof, a glass panel may be used in a tilted or horizontal state.

When a motor vehicle is fitted with a sunroof including a transparent sunroof panel such as those made of glass, for example, the sunroof brightens the interior of the vehicle and provides a sense of openness on the one hand, but may excessively brighten or warm the interior of the vehicle. To control the excessive admission of sunlight, a sunshade may be provided under the sunroof panel so as to be slidably moveable between an open position for admitting the sunlight and a closed position for blocking the sunlight.

When the sunroof is configured to enable tilting of the sunroof panel for ventilation, it may be desirable that the sunshade is integral with the sunroof panel so that the sunshade can be tilted together with the sunroof panel to allow the vehicle passenger to recognize whether the sunroof panel is opened (tilted) even when the sunshade is closed. As a sunshade device for fulfilling such a need, JP 9-249027A discloses a sunshade device including a transparent case attached to the passenger compartment side of a tiltable sunroof panel, a fixed light-polarizing film fixedly disposed in the case, a movable light-polarizing film contained in the case so as to be slidable relative to the fixed light-polarizing film, and a drive mechanism attached to the passenger compartment side of the sunroof panel to slidably move the movable light-polarizing film such that the light-blocking ratio of the sunshade device can be adjusted continuously by changing the position of the movable light-polarizing film relative to the fixed light-polarizing film.

As an alternative to a conventional mechanical sunshade, an electric sunshade has been proposed. An electric sunshade may comprise a light control film including a pair of resin films each having a transparent conductive layer coated thereon, and light control particles such as liquid crystal particles suspended in an appropriate medium disposed between the conductive layers, such that the light-transmitting and/or light-scattering characteristics of the light control film can be varied continuously by controlling the voltage applied across the conductive layers and thereby controlling the orientation of the light control particles therebetween (see JP 2009-534557A, for example). Such a light control film may be incorporated into a glass panel to provide a voltage-regulated light control sunroof panel in which the light-transmitting and/or light-scattering characteristics of the sunroof panel can be adjusted continuously by controlling the voltage applied to the incorporated light control film.

In such a sunroof panel formed by incorporating a light control film into a glass panel, it is necessary to include, in addition to the light control film, various intermediate layers such as an infrared (IR) and/or ultraviolet (UV) cut film between a pair of glass sheets, and the resulting complicated structure tends to lead to a higher cost. On the other hand, in recent years, light control films not incorporated into other devices are available at relatively low prices. Therefore, it may be considered to attach a light control film to a conventional glass panel by means of a double-sided adhesive tape or the like, and use the assembly of the light control film and the glass panel as a light control glass panel. However, when a glass panel having a light control film attached thereto is used in an application in which the glass panel may be directly exposed to sunlight, the temperature of the glass panel and the light control film may change significantly, and since the glass panel and the light control film have different thermal expansion coefficients, repeated thermal expansion and contraction may result in the light control film peeling from the glass panel, or an excessively high or low temperature may cause damage or wrinkle to the light control film.

Such problems may be created not only when a light control film is attached to a glass panel but also when any other film-shaped electric device is attached to a glass panel.

SUMMARY OF THE INVENTION

In view of the aforementioned problems in the prior art, a primary object of the present invention is to provide a mounting structure for a film-shaped electric device, where the mounting structure allows the film-shaped electric device to be mounted to a glass panel such that unfavorable effects caused by thermal expansion and contraction of the film-shaped electric device can be reduced.

To achieve such an object, the present invention provides a mounting structure for mounting a film-shaped electric device to a glass panel, comprising: a resin panel attached to a surface of the film-shaped electric device to form a panel-shaped electric device jointly with the film-shaped electric device, the panel-shaped electric device having a first edge and a second edge; and first and second retaining members attached to one surface of the glass panel in correspondence with the first and second edges of the panel-shaped electric device, respectively, each of the first and second retaining members defining a groove such that the groove opens toward a region of the glass panel to be covered by the panel-shaped electric device, wherein the panel-shaped electric device is retained by the first and second retaining members with the first and second edges of the panel-shaped electric device being received in the grooves defined by the first and second retaining members, respectively, such that the surface of the film-shaped electric device having the resin panel attached thereto faces away from the glass panel.

According to this structure, since the panel-shaped electric device formed by attaching the resin panel to the film-shaped electric device is retained by the first and second retaining members attached to one surface of the glass panel, with the first and second edges of the panel-shaped electric device being received in the grooves defined by the first and second retaining members, respectively, the film-shaped electric device can be mounted to the glass panel such that unfavorable effects caused by thermal expansion and contraction of the film-shaped electric device can be reduced. Further, the resin panel attached to the film-shaped electric device protects the film-shaped electric device from damage. The resin panel also prevents the film-shaped electric device from sagging, which would be caused in the film-shaped electric device if the film-shaped electric device alone were retained by the retaining members.

In a preferred embodiment of the present invention, the first and second retaining members are arranged such that a space is formed between a bottom of the groove defined by at least one of the first and second retaining members and the corresponding edge of the panel-shaped electric device when the panel-shaped electric device is retained by the first and second retaining members.

Since resin generally has a thermal expansion coefficient higher than that of glass, the panel-shaped electric device formed by attaching the resin panel to the film-shaped electric device has a thermal expansion coefficient higher than that of the glass panel, and thus, expands more than the glass panel when subjected to a high temperature. However, according to the foregoing structure, since the panel-shaped electric device can expand without restraint to the edges thereof, deformation of the panel-shaped electric device can be prevented even when the panel-shaped electric device expands at a high temperature.

In a preferred embodiment of the present invention, the panel-shaped electric device has a third edge extending in a direction intersecting the first and second edges; the mounting structure further comprises a third retaining member attached to the one surface of the glass panel in correspondence with the third edge of the panel-shaped electric device so as to extend in a direction intersecting the first and second retaining members, the third retaining member defining a groove such that the groove opens toward the region of the glass panel to be covered by the panel-shaped electric device; and the panel-shaped electric device is additionally retained by the third retaining member with the third edge of the panel-shaped being received in the groove of the third retaining member.

According to this structure, movement of the panel-shaped electric device also can be restricted in a direction perpendicular to the third edge.

In a preferred embodiment of the present invention, the glass panel is a sunroof glass panel that is supported by a frame-shaped glass panel holder extending along a periphery of the glass panel and is movable relative to a roof of a vehicle body; and at least a part of each of the first and second retaining members is positioned outside an inner edge of the glass panel holder.

According to this structure, the first and second retaining members can be less visible from the vehicle cabin, and therefore, the appearance of the interior of the vehicle cabin can be improved.

In a preferred embodiment of the present invention, the glass panel is a sunroof glass panel mounted to a roof of a vehicle body and having a size larger than an opening formed in an inner panel defining a vehicle cabin; and at least a part of each of the first and second retaining members is positioned outside the opening in the inner panel.

According to this structure, the first and second retaining members can be less visible from the vehicle cabin, and therefore, the appearance of the interior of the vehicle cabin can be improved.

In a preferred embodiment of the present invention, the film-shaped electric device may be a light control film having at least one of light-transmitting and light-scattering characteristics variable in response to a voltage applied to the light control film or may be a film-shaped electric power generator that generates electricity from incident light.

As is described in the foregoing, according to the present invention, it is possible to provide a mounting structure for a film-shaped electric device, where the mounting structure allows the film-shaped electric device to be mounted to a glass panel such that unfavorable effects caused by thermal expansion and contraction of the film-shaped electric device can be reduced.

BRIEF DESCRIPTION OF THE DRAWINGS

Now the present invention is described in the following with reference to the appended drawings, in which.

DETAILED DESCRIPTION OF THE PREFERRED EMBODIMENTS

In the following, with reference to the drawings, description will be given of an embodiment of a mounting structure for a film-shaped electric device, in which the present invention is applied to mounting of a light control film to a glass panel.

Figure 1:
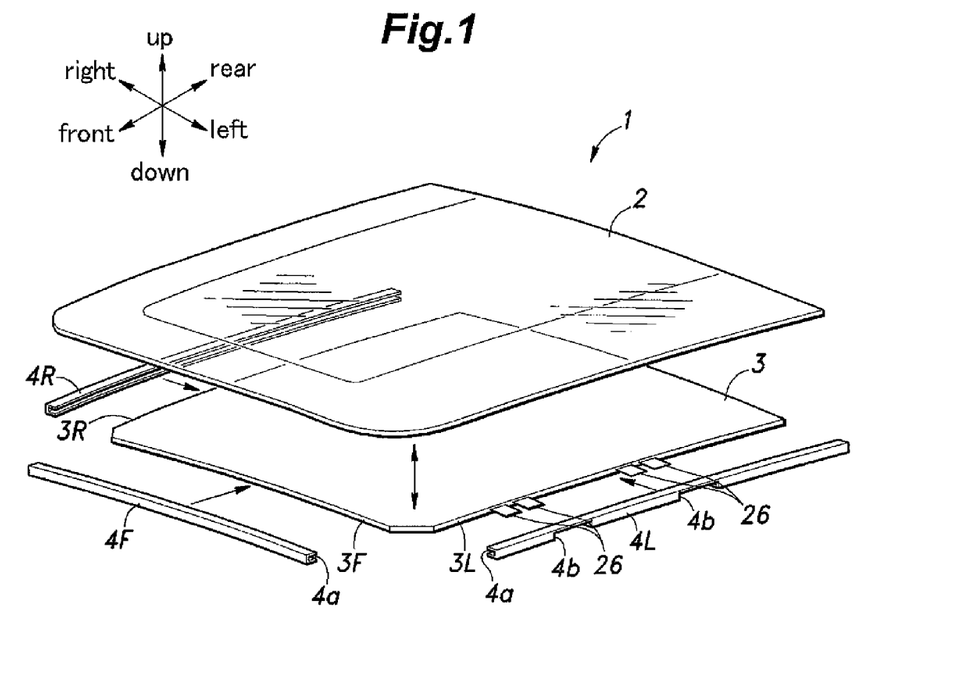
FIG. 1 is an exploded perspective view of a light control sunroof panel according to an embodiment of the present invention.

With reference to FIG. 1, a light control sunroof panel 1 comprises: a glass panel 2 to be mounted to a roof of a vehicle body; a light control panel 3 secured to the underside of the glass panel 2; and three retaining members 4 (namely, front, right and left retaining members 4F, 4R, 4L) attached to the underside of the glass panel 2 to retain the light control panel 3.

Figure 2:
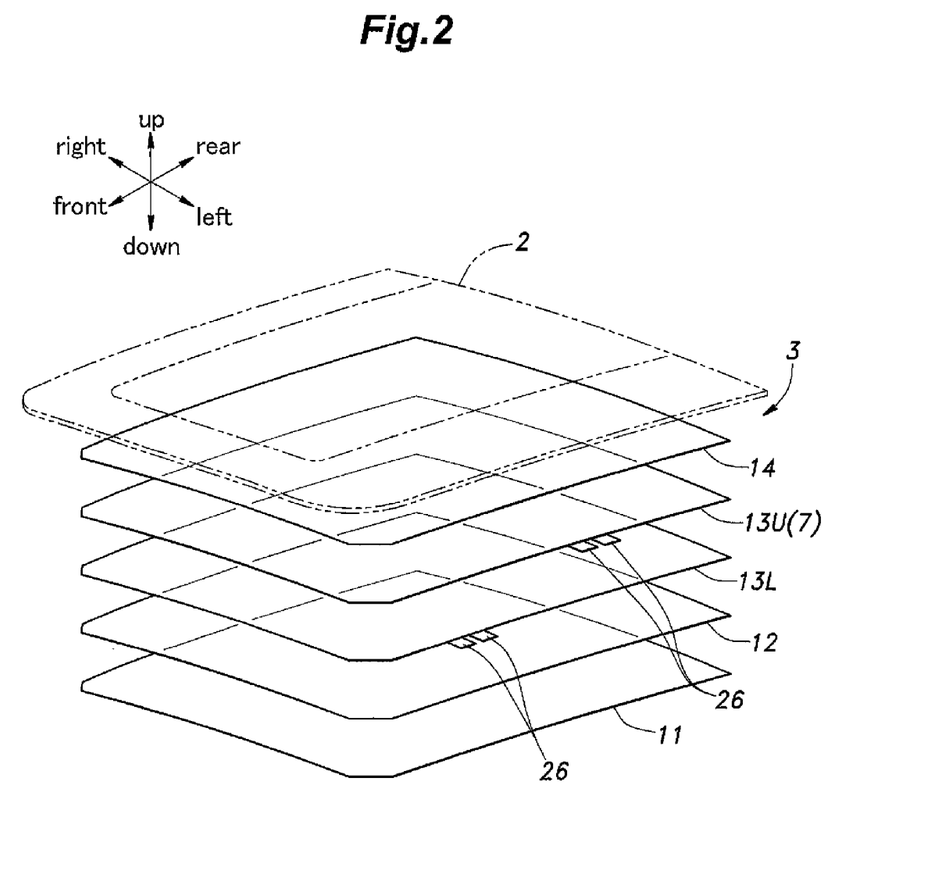
FIG. 2 is an exploded view of a light control panel shown in FIG. 1.

As shown in FIG. 2, the light control panel 3 comprises: a resin panel 11 disposed at the lowermost part of the light control panel 3; two light control films 13 (a lower light control film 13L and an upper light control film 13U) disposed on the top of the resin panel 11; and a UV-IR cut film 14 disposed on the top of the upper light control film 13U. Each pair of adjoining members of the light control panel 3 are attached to each other by a double-sided adhesive film 12 interposed therebetween, though only the double-sided adhesive film 12 disposed between the resin panel 11 and the lower light control film 13L is shown in FIG. 2.

The resin panel 11 is preferably made of polycarbonate, which has excellent impact resistance, heat resistance, resistance to burning, and transparency, and it is preferable if the under surface or each of the under and top surfaces of the resin panel 11 is hard-coated. A resin panel made of polycarbonate and provided with a melamine-based hard coat may be commercially available from Teijin Chemicals Ltd. under the product name of Panlite (registered trademark) PC-8199, for example. The resin panel 11 is disposed on the passenger compartment side of the light control panel 3 and functions to protect the light control films 13. To achieve such a function, the resin panel 11 preferably has a thickness of 0.8 mm or greater.

Preferably, the double-sided adhesive film 12 is of a baseless type and has high transparency. Such a double-sided adhesive film may be commercially available from DIC Corporation under the product name of Z87012W (thickness t=50 μm), for example.

Figure 3A:
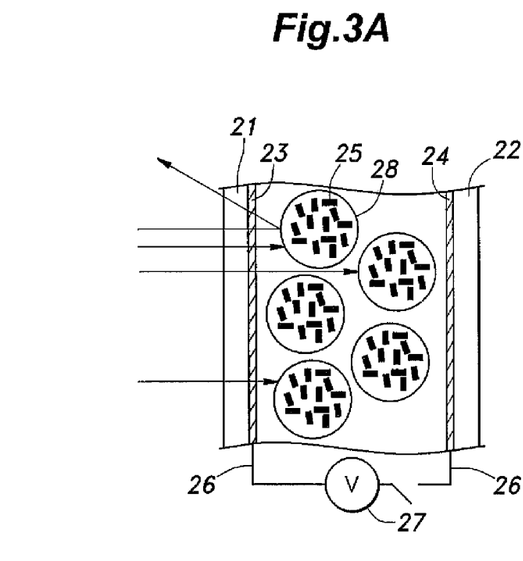
FIGS. 3A and 3B are each a schematic view showing a cross section of a light control film shown in FIG. 2.
Figure 3B:
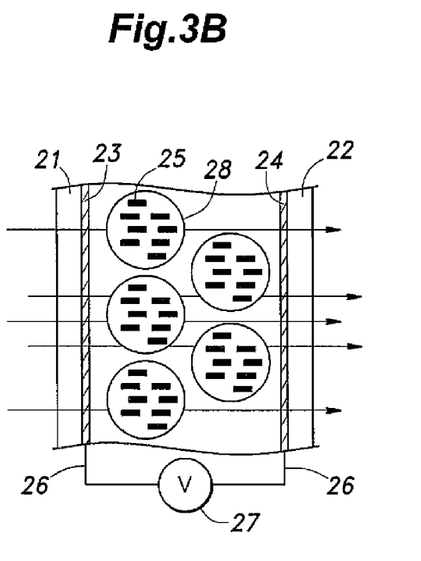

With additional reference to FIGS. 3A and 3B, each light control film 13 comprises: a pair of transparent resin films 21 and 22; a pair of transparent conductive layers 23 and 24 coated on inner surfaces of the pair of transparent resin films 21 and 22, respectively; and light control particles 25 dispersed between the two conductive layers 23 and 24. A pair of bus bars 26 are connected to the right edges of the conductive layers 23 and 24, respectively, to receive an AC voltage supplied from a power supply 27 via an inverter not shown in the drawings. When a voltage is applied to the light control film 13, the light control particles 25 respond to the applied voltage to vary at least one of the light-transmitting and light-scattering characteristics of the light control film 13. The light control particles 25 may be liquid crystal particles or other particles suspended in an appropriate medium. In the illustrated embodiment, droplets 28 containing the light control particles 25 are dispersed between the resin films 21 and 22. Such a light control film 13 may be commercially available from Nippon Sheet Glass Co., Ltd., under the product name of UMU film (registered trademark), for example.

It is to be noted that preferably, the transparent resin films 21 and 22 of the light control film 13 each have a thermal expansion coefficient close to that of the resin panel 11 (polycarbonate) to prevent deformation and/or peeling of the light control film 13 from the resin panel 11 due to the difference in the thermal expansion coefficient between them. Specifically, it is preferred that the difference in the thermal expansion coefficient between the light control film 13 and the resin panel 11 is smaller than the difference in the thermal expansion coefficient between the light control film 13 and the glass panel 2.

When no voltage is applied to the light control film 13, the light control particles 25 are oriented in random directions as shown in FIG. 3A, and incident light is absorbed or diffuse-reflected by the light control particles 25 and cannot pass through the light control film 13; namely, the light control film 13 becomes opaque (or translucent). On the other hand, when an AC voltage of a sufficient amplitude is applied to the light control film 13, the light control particles 25 are oriented in parallel with the direction of the electric field as shown in FIG. 3B, and incident light is allowed to pass straight through the light control film 13. Thus, the transparency of the light control film 16 is increased gradually as the amplitude of the AC voltage applied to the light control film 13 is increased.

Figure 4:
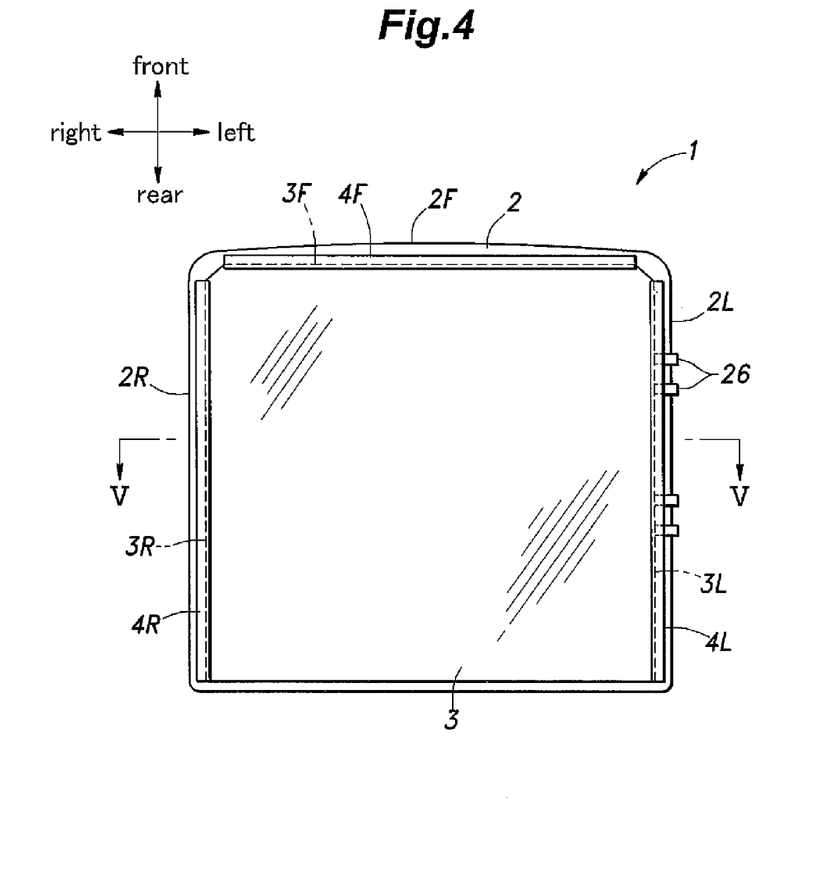
FIG. 4 is a bottom view of the light control sunroof panel shown in FIG. 1.

As shown in FIG. 4, the glass panel 2 has a substantially rectangular shape with rounded corners, where the front left and right corners each have a larger radius of curvature than that of the rear left and right corners. On the other hand, the light control panel 3 has a substantially rectangular shape slightly smaller than the glass panel 2, and has front left and right corners beveled in conformity with the rounded front corners of the glass panel 2. The light control panel 3 has a right edge 3R and a left edge 3L which are substantially in parallel with each other and a front edge 3F which extends substantially perpendicularly to the right and left edges 3R and 3L.

The three retaining members 4 are arranged to extend along the front edge 2F, right edge 2R and left edge 2L of the glass panel 2 in a rectangular C-shape to retain the light control panel 3 at a central portion of the glass panel 2 such that the light control panel 3 covers a substantially entire region of the glass panel 2 except for a peripheral portion of the same. More specifically, the right retaining member 4R and the left retaining member 4L are arranged in parallel with each other, and the front retaining member 4F is disposed to extend perpendicularly to the right retaining member 4R and the left retaining member 4L. Each retaining member 4 is bonded to the underside of the glass panel 2 by means of a double-sided adhesive tape 5 (see FIG. 5).

Figure 5:
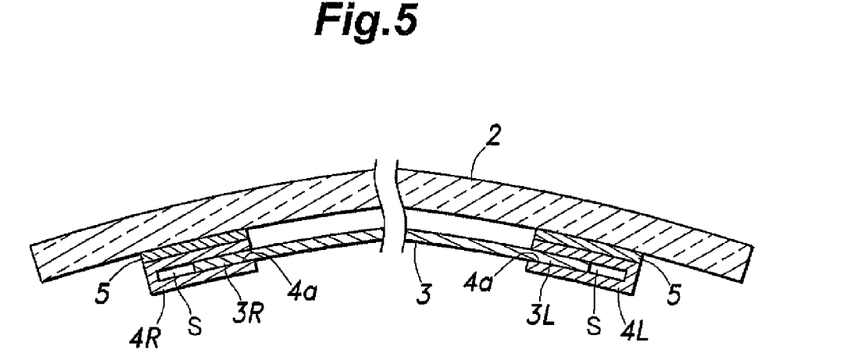
FIG. 5 is a cross-sectional view taken along line V-V in FIG. 4.

With additional reference to FIG. 5, each retaining member 4 comprises an elongated member having a groove 4a formed therein so as to have the same rectangular C-shaped cross section throughout its length, and is disposed such that the groove 4a opens toward the center of the glass panel 2 or toward the region covered by the light control panel 3. The front edge 3F, right edge 3R and left edge 3L of the light control panel 3 are inserted into the grooves 4a of the front retaining member 4F, right retaining member 4R and left retaining member 4L, respectively, whereby the edges 3F, 3R and 3L are gripped by the corresponding retaining members 4F, 4R and 4L. As a result, the light control panel 3 is retained under the glass panel 2 by the three retaining members 4. It is to be noted that the parts of the left retaining member 4L coinciding with the two pairs of bus bars 26 are provided with through-holes 4b extending through the bottom wall of the groove 4a so that the bus bars 26 can extend through the through-holes 4b (see FIG. 1).

Each retaining member 4 is made of a material such as a metal or an alloy having a thermal expansion coefficient smaller than that of the resin panel 11 (polycarbonate), namely, a material having a thermal expansion coefficient closer to that of the glass panel 2 than the resin panel 11. Such a material may be aluminum or an alloy thereof, for example. Owing to such a feature, even when the light control sunroof panel 1 undergoes expansion due to a high temperature caused by exposure to direct sunlight or the like, or even if the light control sunroof panel 1 repeats expansion and contraction, the retaining members 4 are prevented from peeling off from the glass panel 2.

As shown in FIG. 5, the right and left retaining members 4R and 4L are arranged such that a space S is formed between a bottom of the groove 4a of at least one of the right and left retaining members 4R and 4L and the corresponding edge (the right edge 3R or the left edge 3L) of the light control panel 3 when the light control panel 3 is retained by the right and left retaining members 4R and 4L. In the illustrated embodiment, the light control panel 3 is retained such that a space S is formed between the bottom of the groove 4a of each of the right and left retaining members 4R and 4L and the corresponding edge of the light control panel 3.

Further, the glass panel 2 is curved such that the central portion thereof in the lateral direction protrudes upward, and the light control panel 3 also is curved to be convex upward to conform to the curvature of the glass panel 2. The curvature of the light control panel 3 may be formed when the resin panel 11 is injection molded or extrusion molded. Alternatively, the curvature may be provided to the light control panel 3 after the resin panel 11 is molded in a flat plate shape.

In the mounting structure for the light control films 13 described in the foregoing, since the light control films 13 (specifically, the lower light control film 13L) are attached to the resin panel 11 to form the light control panel 3 and the light control panel 3 is retained by the retaining members 4 attached to the under surface of the glass panel 2, with the edges of the light control panel 3 being received in the grooves 4a defined by the corresponding retaining members 4, contraction of the light control panel 3 (and hence the light control films 13 contained therein) at a low temperature is not hindered, and thus, deformation and/or detachment of the light control panel 3 from the glass panel 2 due to thermal expansion and contraction of the light control panel 3 can be suppressed. Further, if the light control films 13 were retained by the retaining members 4 without use of the resin panel 11, the light control films 13 would sag easily. However, in the illustrated embodiment, the resin panel 11 attached to the light control films 13 serves as a support member, preventing sagging of the light control films 13. The resin panel 11 also protects the light control films 13 from external impact. Further, in a case where the light control films 13 have a thermal expansion coefficient close to that of the resin panel 11, peeling of the light control films 13 from the resin panel 11 due to thermal expansion and contraction can be suppressed.

There is a difference in the thermal expansion coefficient between the light control panel 3, which includes the resin panel 11 as a base member, and the glass panel 2, since resin generally has a thermal expansion coefficient higher than that of glass, and thus, when subjected to a high temperature, the light control panel 3 expands more than the glass panel 2. However, in the illustrated embodiment, the right and left retaining members 4R and 4L are arranged such that a space S is formed between each of the right and left edges 3R and 3L of the light control panel 3 and the bottom of the corresponding groove 4a when the light control panel 3 is retained between the retaining members 4R and 4L, and therefore, the light control panel 3 is allowed to expand without restraint to the right and left edges 3R. Consequently, undesirable deformation of the light control panel 3 can be prevented if the light control panel 3 expands when subjected to a high temperature.

In the illustrated embodiment, in addition to the right and left retaining members 4R and 4L, the front retaining member 4F is bonded to the underside of the glass panel 2 so as to be perpendicular to the retaining members 4R and 4L, and the light control panel 3 is retained by the front retaining member 4F also. Specifically, the front edge 3F of the light control panel 3 is inserted into and gripped by the groove 4a defined by the front retaining member 4F. This contributes to preventing undesirable forward and rearward displacement of the light control panel 3. It is to be noted that when the light control panel 3 is retained by the front retaining member 4F, a space may or may not be formed between the front edge 3F of the light control panel 3 and the bottom of the groove 4a of the front retaining member 4F. In either case, the light control panel 3 can expand freely in the fore-and-aft direction when subjected to a high temperature, since the rear edge of the light control panel 3 is not restrained.

Figure 6:
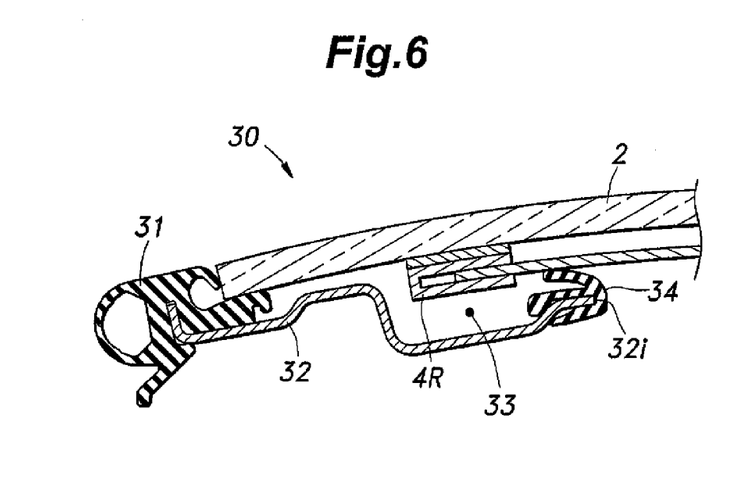
FIG. 6 is a fragmentary cross-sectional view of a slidable panel embodied by the light control sunroof panel shown in FIG. 1.

As shown in FIG. 6, in a case where the light control sunroof panel 1 is used as a movable panel 30 in a sliding roof system or the like, the glass panel 2 of the sunroof panel 1 (movable panel 30) is attached to and supported by a glass panel holder 32, which is adapted to be movable by a tilting and/or sliding mechanism. The glass panel holder 32 is a frame-shaped member extending along the periphery of the glass panel 2, and a weather strip 31 is attached to an outer periphery of the glass panel holder 32 such that the movable panel 30 is supported by the glass panel holder 32 via the weather strip 31. The glass panel holder 32 defines a containment space 33 on an inner peripheral part thereof such that the retaining members 4 are accommodated in the containment space 33. In other words, the retaining members 4 are located outside the inner periphery 32i of the glass panel holder 32. This makes the retaining members 4 less visible and contributes to improving the appearance of the interior of the vehicle cabin. Preferably, an ornamental member 34 made of an elastic material is attached to the inner periphery 32i of the glass panel holder 32 to fill the gap between the inner periphery 32i and the light control panel 3. It is to be noted that at least a part of each retaining member 4 may be located outside the inner periphery 32i of the glass panel holder 32 though it is preferred that the entirety of each retaining member 4 is located outside the inner periphery 32i of the glass panel holder 32.

Figure 7:
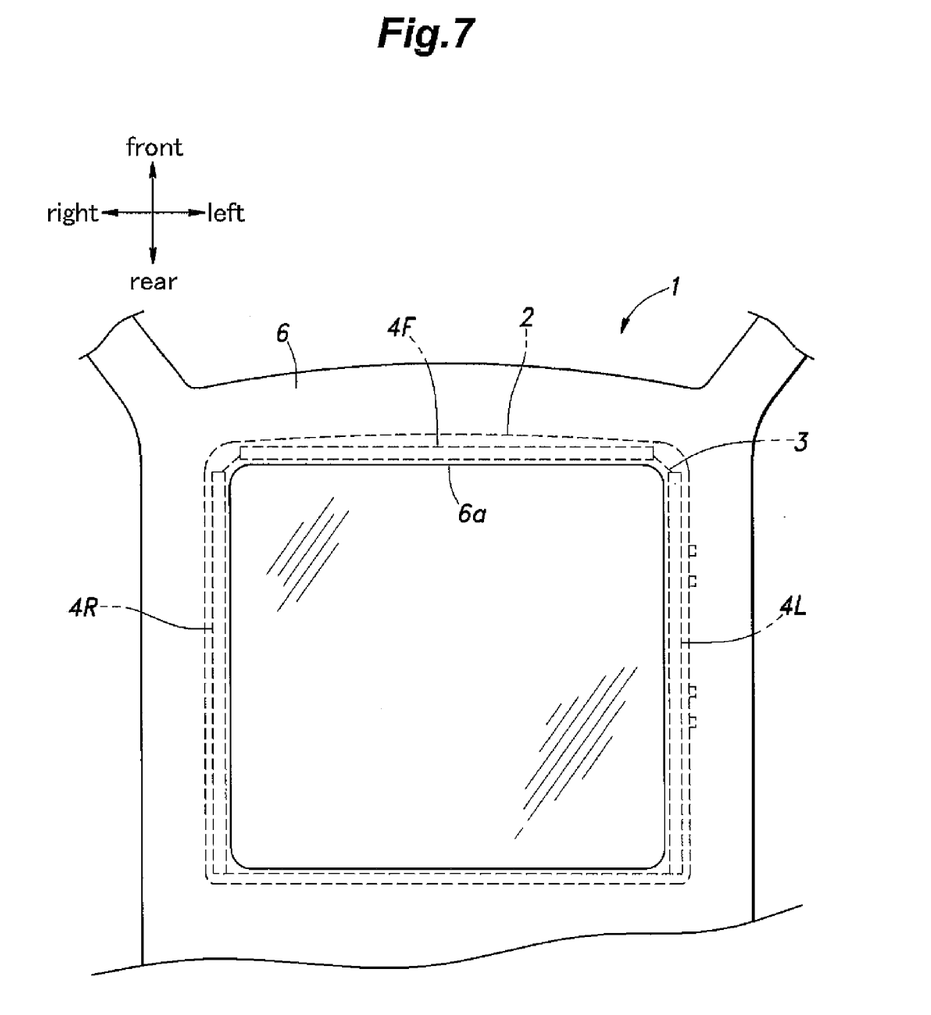
FIG. 7 is a bottom view showing the light control sunroof panel mounted to a roof of a vehicle body.

With reference to FIG. 7, an inner panel 6 having an opening 6a formed therein is disposed under the roof of the vehicle body to define a vehicle cabin. Preferably, each of the glass panel 2 and the light control panel 3 is larger in size than the opening 6a, and each of the three retaining members 4 is attached to the glass panel 2 so as to be located outside the opening 6a in its entirety. In such an arrangement, not only the glass panel holder 32 can be less visible when the light control sunroof panel 1 is used as the slide panel 30, but also the retaining members 4 can be hidden from view from the vehicle cabin when the light control sunroof panel 1 is used as a fixed roof, thereby improving the appearance of the interior of the vehicle cabin. It is to be noted that at least a part of each retaining members 4 may be located outside the opening 6a though it is preferred that the entirety of each retaining member 4 is located outside the opening 6a.

<First Modified Embodiment>

Figure 8:
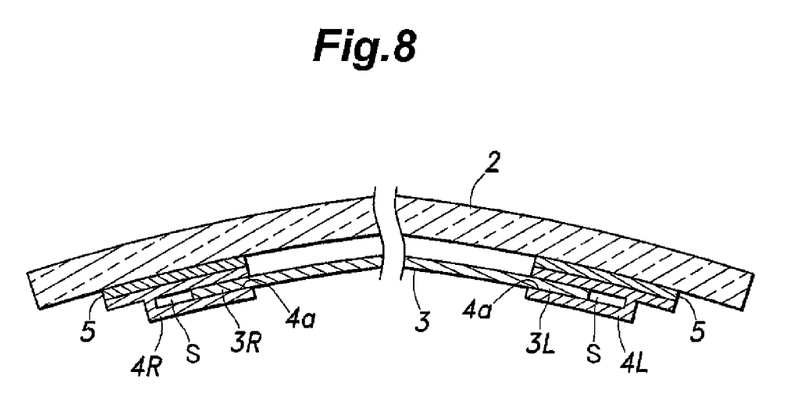
FIG. 8 is a cross-sectional view of a light control sunroof panel according to a first modified embodiment taken in a manner similar to FIG. 5.

Next, a first modified embodiment of the present invention will be described with reference to FIG. 8. The parts identical with or similar to those of the previous embodiment are denoted with like numerals in FIG. 8, and the description of such parts are omitted in the following description. This also applies to the description of a second modified embodiment.

In the first modified embodiment, the cross-sectional shape of each retaining member 4 is different from that in the previous embodiment. Specifically, each retaining member 4, which is provided with the groove 4a opening toward the central portion of the glass panel 2 or the region of the glass panel 2 covered by the light control panel 3, includes a projection wall extending outward from the upper wall thereof, such that the retaining member 4 has a larger top surface area than in the previous embodiment. In this embodiment also, each retaining member 4 is attached to the glass panel 2 by means of a double-sided adhesive tape 5 that covers an entire top surface of the retaining member 4, as in the previous embodiment. According to this structure, the increased adhesion area can increase the adhesion strength of each retaining member 4 to the glass panel 2.

<Second Modified Embodiment>

Figure 9:
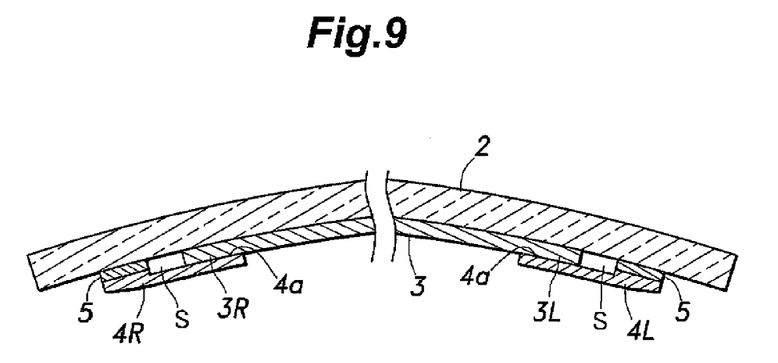
FIG. 9 is a cross-sectional view of a light control sunroof panel according to a second modified embodiment taken in a manner similar to FIG. 5.

Next, a second modified embodiment of the present invention will be described with reference to FIG. 9. In this modified embodiment, each retaining member 4 does not include the groove 4a of its own, but has a stepped top surface including an outer elevated part, such that when the retaining member 4 is attached to the glass panel 2 by means of a double-sided adhesive tape 5 applied onto the elevated part of the top surface, the retaining member 4 defines a groove 4a jointly with the glass panel 2 such that the groove 4a opens toward the region of the glass panel 2 to be covered by the light control panel 3. In this structure also, the front, right and left edges 3F, 3R and 3L of the light control panel 3 are inserted into the corresponding grooves 4a defined as described above, whereby each edge 3F, 3R and 3L is sandwiched by the glass panel 2 and the corresponding retaining member 4 to retain the light control panel 3 in contact with the under surface of the glass panel 2. In this embodiment, the rigidity of the light control panel 3 can be improved owing to the contact between the light control panel 3 and the glass panel 2.

It is to be noted that in the first and second modified embodiments also, it is possible to use the glass panel holder 32 as shown in FIG. 6 to utilize the light control sunroof panel 1 as the movable panel 30.

Although the present invention has been described in the foregoing in terms of preferred embodiments thereof, it is obvious to a person skilled in the art that various alterations and modifications are possible without departing from the scope of the present invention which is set forth in the appended claims. For example, though in the illustrated embodiment a space S is formed between the bottom of the groove 4a of each of the right and left retaining members 4R and 4L and the corresponding edge of the light control panel 3, it is possible that the space S is formed in only one of the right and left retaining members 4R and 4L or no space S is formed in either of the right and left retaining members 4R and 4L. Further, though the illustrated embodiment includes the front retaining member 4F attached to the glass panel 2, it is possible to omit the front retaining member 4F and retain the light control panel 3 by only the right and left retaining members 4R and 4L. The right and left retaining members 4R and 4L, which are arranged to be in parallel with each other in the illustrated embodiment, may be arranged in another pattern in conformity with the shape of the light control panel 3. For example, right and left retaining members 4R and 4L may be arranged such that the distance therebetween gradually increases in the direction of elongation. Further, though the light control panel 3 in the illustrated embodiment includes two laminated light control films 13, the light control panel 3 may include only a single light control film 13. Still further, though in the illustrated embodiment, the resin panel 11 is attached to only the under surface of the light control films 13 to form the light control panel 3, another resin panel 11 may be additionally attached to the top surface of the light control films 13. Still further, the sunroof panel 1 may be fixedly mounted to the vehicle roof or may be mounted to the vehicle roof so as to be slidable and/or tiltable. Further, though the illustrated embodiment includes the light control films 13 as an example of a film-shaped electric device, any other film-shaped electric device may be used instead. For example, a film-shaped light control device of a type other than that described in the illustrated embodiment may be used as the film-shaped electric device, or, as designated by reference numeral 7 in parentheses in FIG. 2, a film-shaped electric power generator, such as a solar power generator, that generates electricity from incident light may be used as a film-shaped electric device in place of the light control films 13. In the illustrated embodiment, the present invention is used to mount the light control films 13 to the glass panel 2 of the sunroof panel 1. However, the present invention may be used to mount a film-shaped electric device to a window glass (such as a rear window) of a vehicle, a window glass of a building, or the like. It is also to be noted that not all of the component parts of the light control sunroof panel 1 regarding the present invention shown in the illustrated embodiment are necessarily indispensable, and they may be selectively used as appropriate for purposes.

In the illustrated embodiment, the glass panel 2 and the light control panel 3 mounted to the glass panel 2 have a substantially rectangular shape. However, they may be of another shape such as a triangle, and the present invention may be used to mount a light control film to a quarter glass panel of an automobile, for example.

The contents of the original Japanese patent application(s) on which the Paris Convention priority claim is made for the present application as well as the contents of the prior art references mentioned in this application are incorporated in this application by reference.

The invention claimed is:

1. A mounting structure for mounting a film-shaped electric device to a glass panel, comprising:
   a resin panel attached to a surface of the film-shaped electric device to form a panel-shaped electric device, jointly with the film-shaped electric device, the panel-shaped electric device having a first edge and a second edge; and
   first and second retaining members attached to one surface of the glass panel in correspondence with the first and second edges of the panel-shaped electric device, respectively, each of the first and second retaining members defining a groove such that the groove opens toward a region of the glass panel to be covered by the panel-shaped electric device, each groove extending between an open end and a closed bottom end,
   wherein the panel-shaped electric device is retained by the first and second retaining members with the first and second edges of the panel-shaped electric device being received in the grooves defined by the first and second retaining members, respectively, such that the surface of the film-shaped electric device having the resin panel attached thereto faces away from the glass panel,
   wherein: the glass panel is a sunroof glass panel that is supported by a frame-shaped glass panel holder extending along a periphery of the glass panel and is movable relative to a roof of a vehicle body; and an entirety of each of the first and second retaining members is positioned both outside an inner edge of the glass panel holder and within a containment space defined between the glass panel and the frame-shaped glass panel holder,
   wherein the first and second retaining members are arranged such that a groove space is formed between the closed bottom end of the groove defined by each of the first and second retaining members and the corresponding edge of the panel-shaped electric device when the panel-shaped electric device is retained by the first and second retaining member.

2. The mounting structure according to claim 1, wherein:
   the panel-shaped electric device has a third edge extending in a direction intersecting the first and second edges;
   the mounting structure further comprises a third retaining member attached to the one surface of the glass panel in correspondence with the third edge of the panel-shaped electric device so as to extend in a direction intersecting the first and second retaining members, the third retaining member defining a groove such that the groove opens toward the region of the glass panel to be covered by the panel-shaped electric device; and
   the panel-shaped electric device is additionally retained by the third retaining member with the third edge of the panel-shaped electric device being received in the groove of the third retaining member.

3. The mounting structure according to claim 1, wherein:
the glass panel is mounted to the roof of the vehicle body and has a size larger than an opening formed in an inner panel defining a vehicle cabin; and
at least a part of each of the first and second retaining members is positioned outside the opening in the inner panel.

4. The mounting structure according to claim 1, wherein the film-shaped electric device is a light control film having at least one of light-transmitting and light-scattering characteristics variable in response to a voltage applied there to the light control film.

5. The mounting structure according to claim 1, wherein the film-shaped electric device is a film-shaped electric, power generator that generates electricity from incident light.

6. The mounting structure according to claim 1, wherein each of the first and second retaining members defines a rectangular C-shaped cross-section.

7. The mounting structure according to claim 1, wherein a gap is defined between an inner periphery of the glass panel holder and the panel-shaped electric device.

8. The mounting structure according to claim 7, wherein an elastic member is received within the gap so as to be positioned between the inner periphery of the glass panel holder and the panel-shaped electric device.

\* \* \* \* \*